July 19, 1960

B. C. HARNEY 2,945,287

AUTOMATIC BAR FEED

Filed Feb. 23, 1956

INVENTOR.
Bernard C. Harney
BY
D. Emmett Thompson
ATTORNEY.

B. C. HARNEY

2,945,287

AUTOMATIC BAR FEED

Filed Feb. 23, 1956

INVENTOR.
Bernard C. Harney
BY
D. Emmett Thompson
ATTORNEY

July 19, 1960

B. C. HARNEY 2,945,287

AUTOMATIC BAR FEED

Filed Feb. 23, 1956

INVENTOR.
Bernard C. Harney
BY
D. Emmett Thompson
ATTORNEY.

Fig 12

2,945,287
AUTOMATIC BAR FEED

Bernard C. Harney, Syracuse, N.Y., assignor to Lipe-Rollway Corporation, a corporation of New York Filed Feb. 23, 1956, Ser. No. 567,168

3 Claims. (Cl. 29—93)

This invention relates to automatic bar feeding mechanism used in conjunction with automatic machines for forming parts from metal bars. A bar feed mechanism of this general type is disclosed in Patent No. 2,595,522, to Bernard C. Harney, May 6, 1952.

This invention has as an object an automatic bar feed mechanism particularly adapted for use with a multiple spindle bar working machine, wherein the spindles are mounted in the bar working machine in a vertical or stack arrangement, the bar feed mechanism embodying a particularly compact structure economical to manufacture and which functions efficiently to keep the spindles of the bar working machines supplied with stock bars.

The invention consists in the novel features and in the combination and constructions hereinafter set forth and claimed.

In describing this invention, reference is had to the accompanying drawings in which like characters designate corresponding parts in all the views.

The frame of the device consists essentially of a pair of channel side members 20, 21, supported by a plurality of adjustable leg members 22. There are a plurality of head members or supporting structures designated generally as 25, 26, 27 and 28. Each of these supporting structures consists of a pair of plates 29, 30. The plates 29, 30, of each supporting head are welded to base plates 33 which extend transversely of the side channel members 20, 21, and are fixedly secured thereto. The plates extend upwardly in parallel spaced apart relation and are formed with aligned slots 35 extending inwardly from the rear edges of the plates and inclining downwardly toward the front edges of the plates. The lower wall 36 of each slot joins a V-shaped notch at its inner end in which the stock bar tubes are fixedly secured, the plates 29, 30, of each supporting structure serving to support stock bar tubes and other associated mechanism.

Figure 2:
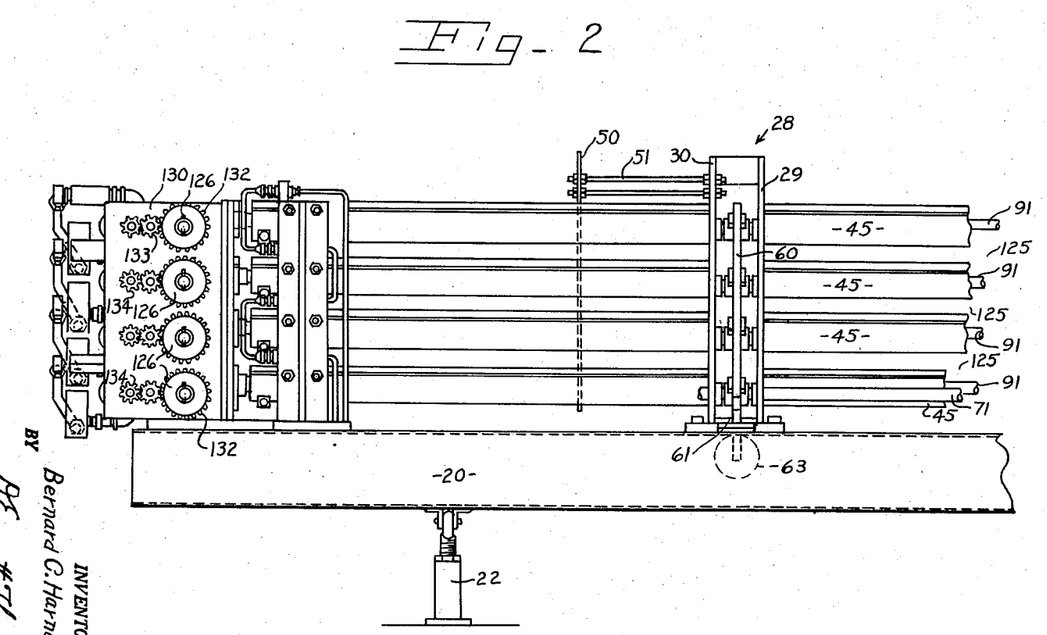
Figure 2 is a side elevational view including the rear or breech section of the mechanism, views 1 and 2 forming a front side elevation of the entire machine.

There is secured to the inner surface of each of the plates 29, confronting the plates 30, a bar 38, as by screws or rivets 40. These bars extend outwardly an appreciable distance beyond the rear edges of the plates 29 and their purpose is to support a supply of stock bars 44, the bars tending to move by gravity toward the stock bar tubes. The stock bar tubes are of general rectangular shape in cross section. The tubes are formed of a bottom section 45 fixedly secured in the V-shaped notches in the supporting plates 29, 30, of each supporting head. The forward end portions of the tubes, and the rear breech portions, are completed by a top section 46, see Figure 3, and these sections 45, 46, at the very forward ends of the tubes, and at the breech sections, are fixedly secured together at the joinder 47 of their lower portions. The upper portions are relieved along their confronting edges to form a lengthwise extending slot 48. The plate 29 of the forward supporting head 25 carries, by means of studs 48$^a$, a sheet metal shield 49 and, in like manner, the plate 30 of the supporting head 28, see Figure 2, carries another vertically extending shield 50, as by studs 51. The purpose of the shields 49, 50, are to form end walls for the stock bar magazine—that is, the stock bars 44 positioned in the slots 35 in the plates 29, 30, of the supporting head structures.

Figure 5:
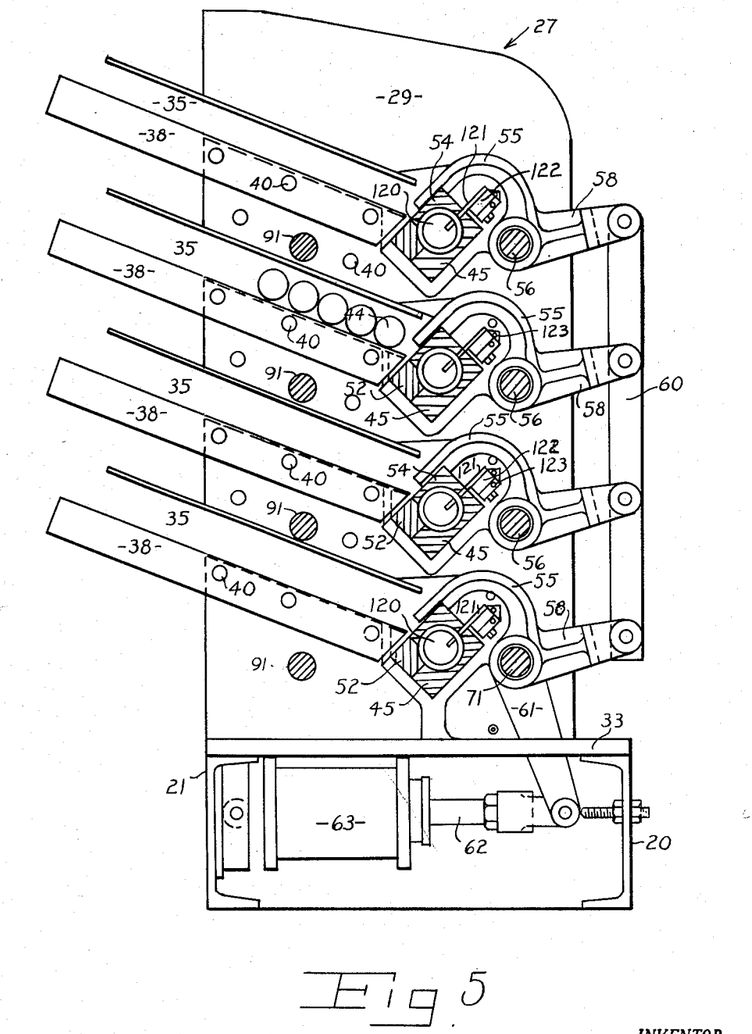
Figure 5 is a view taken on line 5—5, Figure 1.
Figures 6, 11:
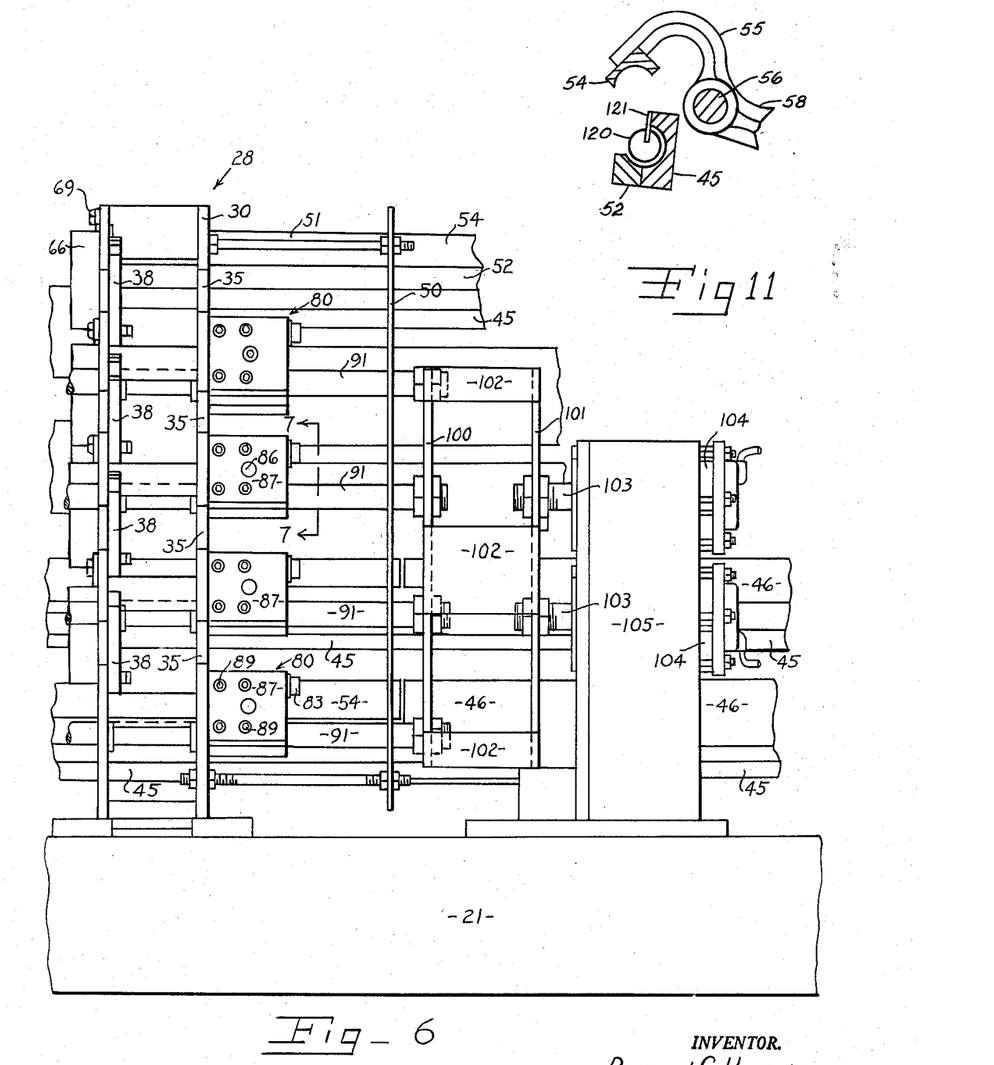
Figure 6 is a partial rear side elevational view taken at the breech section of the machine at approximately the central portion of the structure shown in Figure 2.
Figure 11 is a fragmentary view of the structure shown in the upper right hand portion of Figure 5 illustrating a bar tube loading section moved to open position.

The loading sections of the stock bar tubes intermediate the shields 49, 50, are formed with two upper sections instead of the one section 46 at the front and breech ends of the tubes, see Figure 5. This intermediate section of the tubes includes an upper section 52 fixedly secured to the lower section 45, and a second upper section 54. These sections 54 are secured to arcuate shaped legs 55 of bell crank levers rotatably mounted on pins 56. The pins 56 are mounted in the plates 29, 30, of each supporting head and the bell crank levers are mounted on the pins 56 intermediate the plates. Each bell crank lever has an outwardly extending leg 58 and these outwardly extending legs 58 are pivotally connected by a vertically disposed link 60. At the supporting head structures 26 and 28, the lower bell crank lever also has a depending arm 61 connected to a piston rod 62 operating in a cylinder 63, see Figures 3 and 5. When fluid pressure is applied to the right hand end of cylinder 63, Figure 5, the bell crank levers are moved about their pivot pins 56 in a clockwise direction, moving the movable tube sections 54 upwardly away from the sections 45, 52, as illustrated in Figure 11. This permits transfer of a stock bar from the magazines into the bar tubes.

Figure 3:
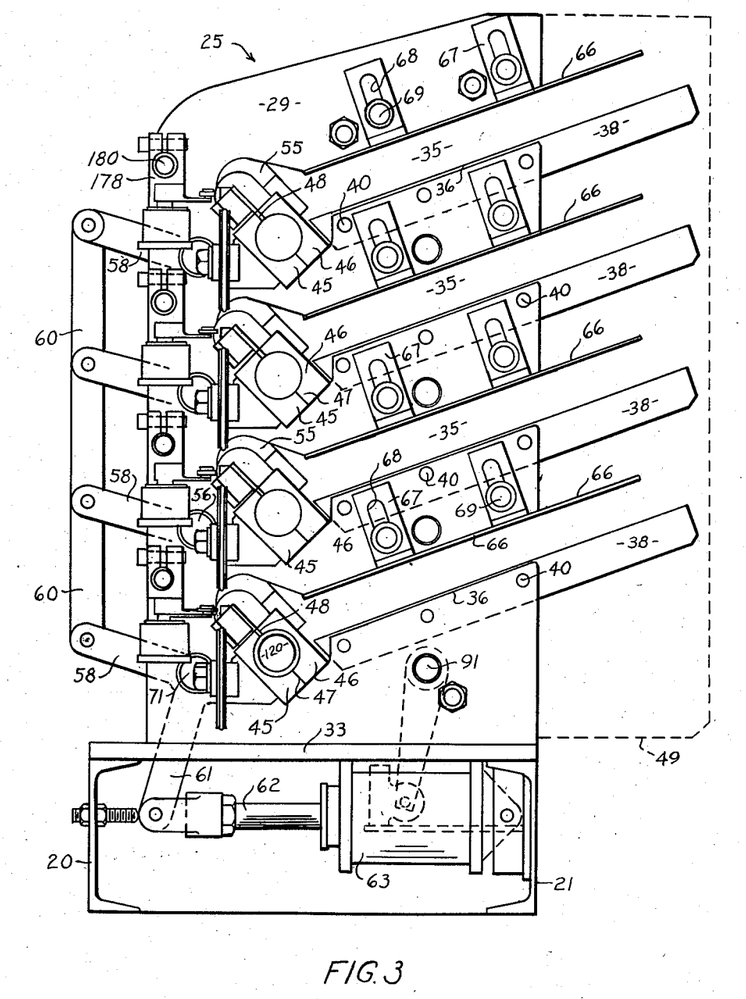
Figure 3 is a front end elevational view looking to the left, Figure 1.
Figure 4:
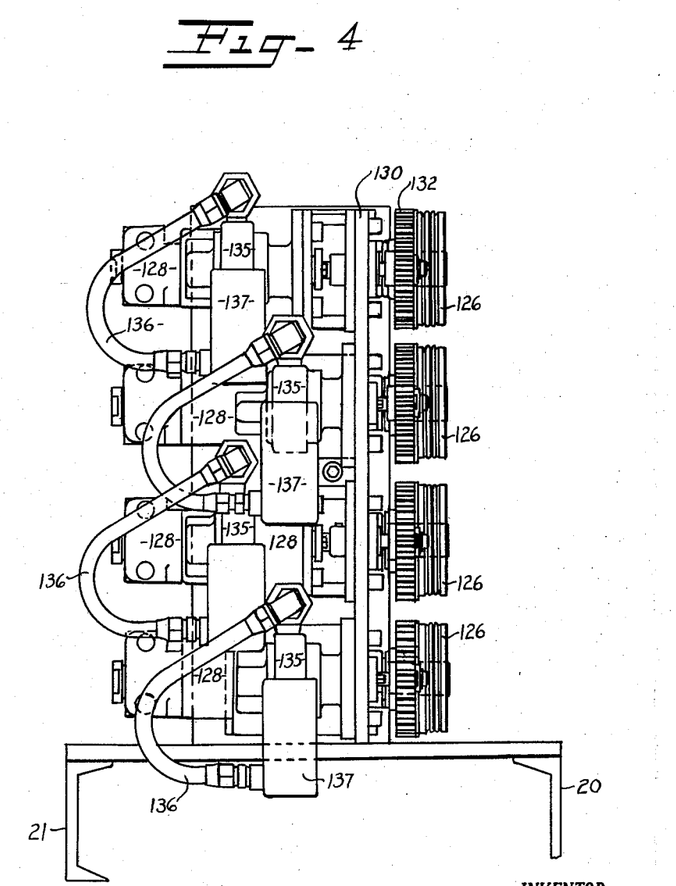
Figure 4 is a rear end elevational view looking to the right, Figure 2.

The plates 29 are provided on their outer sides with stock bar guide plates 66, these being mounted on angle members 67 formed with elongated slots 68 in which screws 69 are positioned, whereby the plates 66 may be adjusted toward and from the bar supporting members 38. This arrangement is to adjust the bar magazines for accommodating stock bars of different diameters, so that when bars of small diameters are used, they will not roll up on top of each other and jam the magazine. This arrangement is illustrated in Figure 3 of the drawings.

The lower bell crank in each of the head structures is fixedly secured to a shaft 71 which extends through all of the supporting head structures 25–28, whereby the two cylinder structures 63 effect oscillation of the shaft 71 to effect the opening and closing of the loading sections of all of the bar tubes simultaneously. In the arrangement illustrated, there are four bar tubes arranged in vertical formation whereby the feed mechanism is adapted for use in conjunction with what is known as a "four high" automatic bar working machine.

Figure 7:
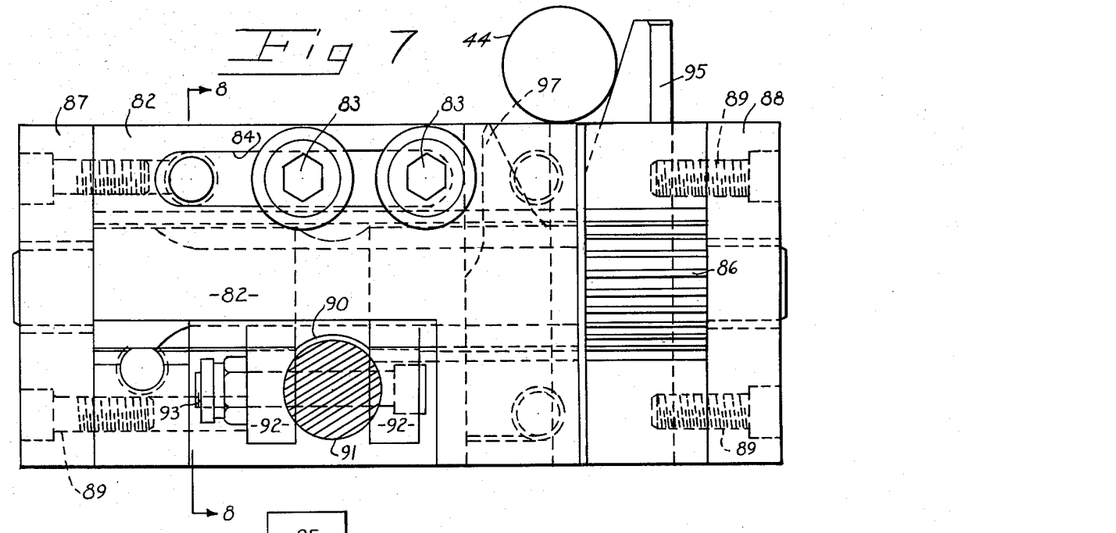
Figure 7 is a side elevational view of one of the mechanisms for feeding stock bars from the magazine into one of the stock bar tubes, the view being taken on line 7—7, Figure 6.
Figure 8:
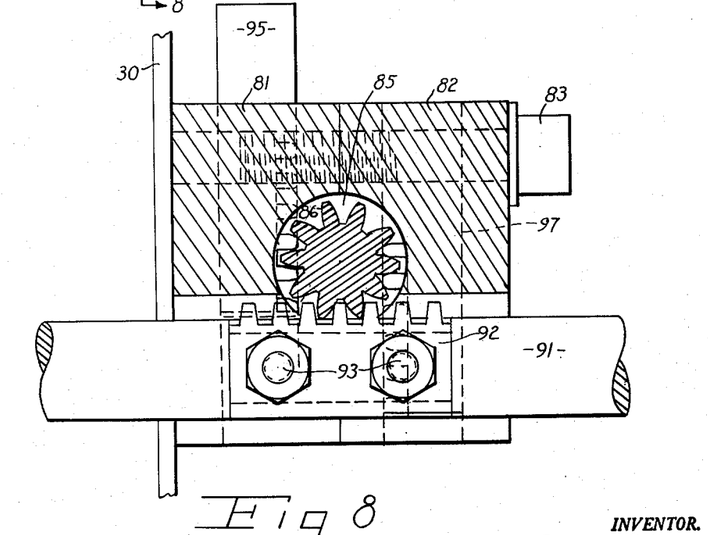
Figure 8 is a view taken on line 8—8, Figure 7.

The stock bars are transferred one at a time from the magazine slots 35 to the bar tubes when the same are open by the mechanism shown in Figures 7 and 8. To each of the plates 30, there is secured a bar transfer mechanism designated generally at 80. These transfer members consist of two blocks 81, 82. The block 81 is secured to the plate 30 below each of the slots 35 and at the inner end thereof. The block 82 is secured to the block 81 by screws 83 extending through an elongated slot 84 and threading into the block 81. The blocks 81, 82, are formed with a circular bore 85 in which is mounted a pinion gear 86. The pinion has reduced end portions journalled in end plates 87, 88, secured to the ends of the block 81 as by screws 89. The central portion of the pinion 86 is formed with a circumferentially extending concavity 90 to accommodate a shaft 91 to opposite sides of which there is secured a gear rack 92, as by screws 93. These gear racks are arranged in mesh with the teeth of the pinion 86 whereby, upon reciprocation of the shafts 91, the pinions 86 are rotated.

The block 81 is formed with a bore extending perpendicular to the bore 85 and a pin 95 is slidably mounted in the bore and is formed with a gear rack on one side engaging the pinion 86, see Figure 8. The block 82 is provided with a like bore in which is slidably mounted a pin 97 which is also formed with gear teeth meshing with the opposite side of the pinion 86. Accordingly, when the pinion is rotated in a clockwise direction Figure 8, the pin 95 is moved upwardly as shown in full line position, and the pin 97 is moved downwardly. When the gear is rotated in a counter-clockwise direction, the pin 95 is moved downwardly and the pin 97 is moved upwardly. As stated, these bar transfer members are located along the lower wall at the inner end of each of the slots 35 in plates 29, 30. Normally, the pins 95 are in up position engaging the lowermost bar 44 in the slot 35 and thus restraining the bars from downward movement toward the bar tubes. When the bar tubes are opened—that is, the movable sections 54 moved upwardly, as shown in Figure 11, the pins 97 are moved upwardly and the pins 95 downwardly. The pins 97 are pointed at their upper ends, as indicated in Figure 7, and extend between the lowermost bar and the next lowermost bar, and thus restrain downward movement of the stock bars in the slots 35, when the pins 95 are moved downwardly to release the lowermost bar so that it will drop into the open bar tube.

The shafts 91 extend lengthwise of the machine, and at their rear ends they are connected to a vertically disposed plate 100, see Figure 6, this plate being connected to a second plate 101, as by cross members 102, and the plate 101 is connected to two piston rods 103 slidably mounted in cylinders 104 carried by an upwardly extending bracket 105 fixedly secured to the frame of the machine. The cylinder structures serve to effect reciprocation of the shafts 91 in unison for the transfer of bars from the stock bar magazines to the respective stock bar tubes when they are open.

Figure 1:
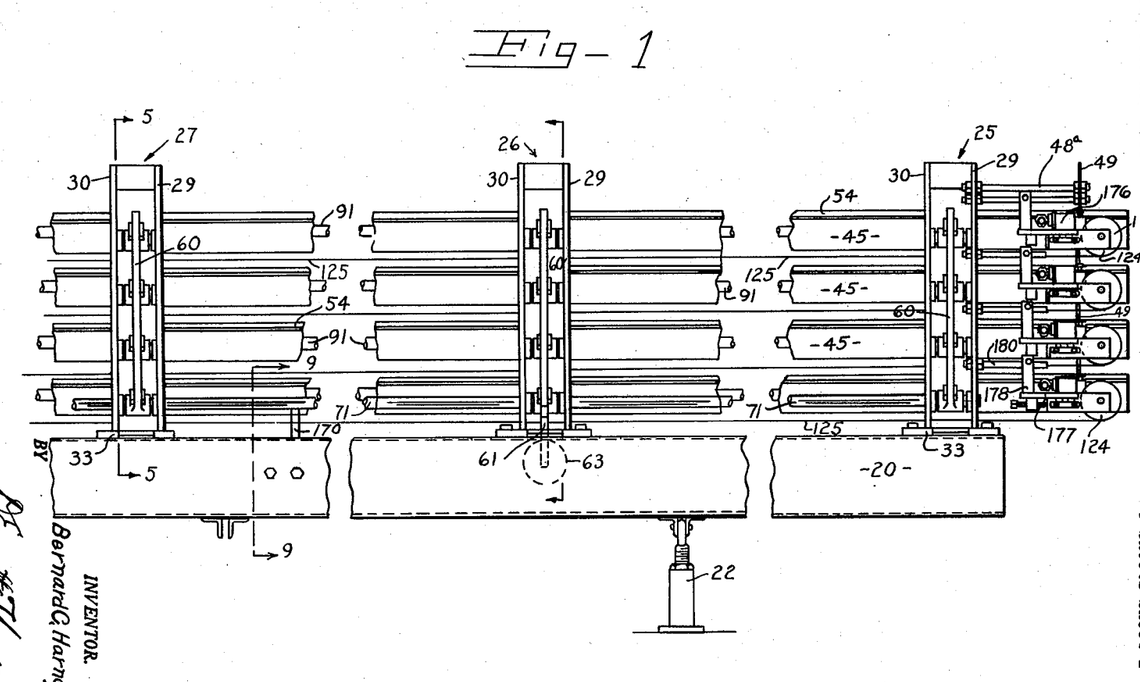
Figure 1 is a side elevational view of the front end portion of an automatic stock bar feed mechanism embodying my invention.

The stock bars are advanced forwardly through the stock bar tubes by a pusher 120 slidably mounted in the bore of the tubes. This pusher may be the type shown in my prior Patent No. 2,681,498. It is provided with a flat plate member 121 extending through the slot between the fixed section 45 of the tube and the movable section 54. The plate 121 is fixed to a block 122 which is clamped to a cable 123 extending along the bar tube and passing over a sheave 124 mounted on the forward end of each tube, see Figure 1, the lower runs 125 of these cables being trained over a drum 126 mounted on the output shaft of a fluid operated motor 128. There is one of these motors for each bar tube and the motors are arranged in vertical arrangement on a vertically extending plate 130 mounted at the rear of the frame. Each drum has associated with it a spur gear 132 arranged in mesh with an intermediate gear 133 which, in turn, is arranged in mesh with a gear 134 mounted on the shaft of a pump 135. The intake and outlet of each pump 135 are connected to a closed circuit consisting of conduit 136 and a regulator 137. These pumps serve as governors to control the speed of the motors 128. The motors 128 are of the reversible type.

Figure 12:
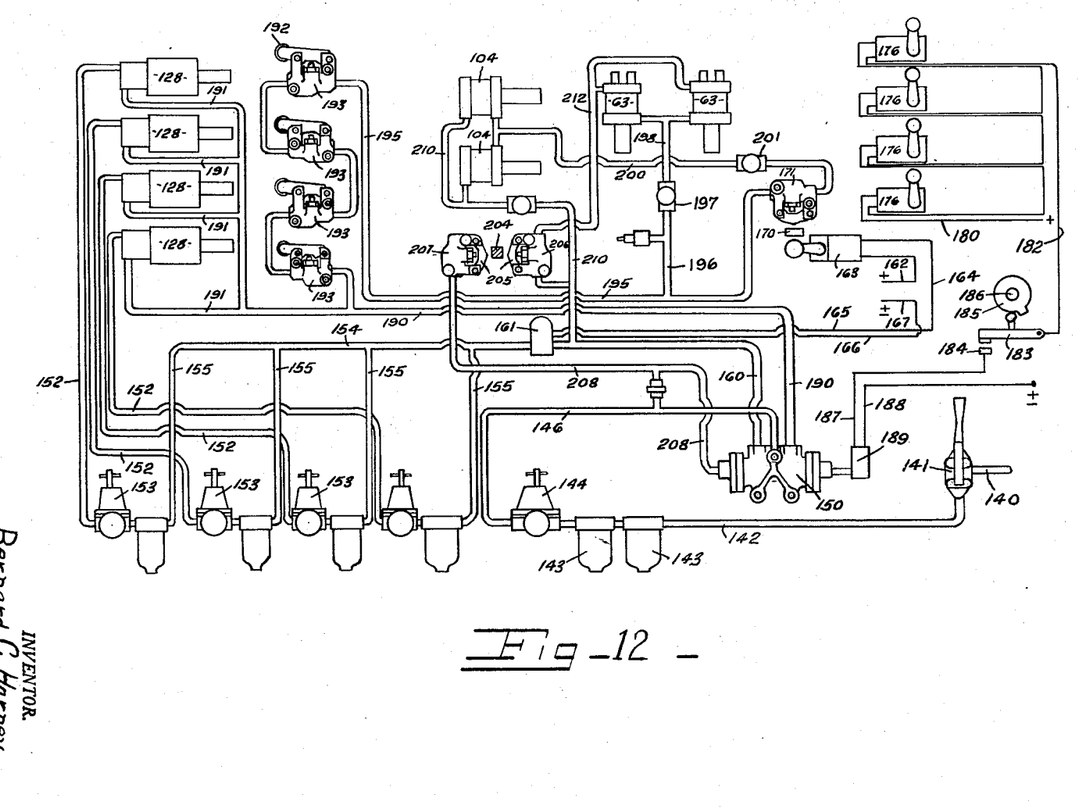
Figure 12 is a schematic diagram of the control circuit.

The control circuit for actuating the movable portions of the bar tubes to open and closed position, actuating the bar loading devices 80 and operating the feed motors 128, is illustrated in Figure 12. The air supply is indicated at 140 being controlled by a manually operated valve 141 connected to a supply conduit 142 containing lubricators 143 and a pressure regulator 144, the outlet of which is connected to a conduit 146 which extends to the inlet of a four-way master control valve 150. When the stock bars are being advanced through the tubes by the pushers 120, air under pressure is supplied to the feed motors 128 by means of conduits 152, these conduits extending from pressure regulators 153 which, in turn, are connected to a supply line 154 through branch conduits 155. The line 154 is connected to a line 160 extending from the master valve 150 through a solenoid valve 161. The circuit to this valve is supplied from one side 162 of a supply switch 163, wire 164, wire 165, solenoid valve 161, wire 166, to the common side 167 of the supply.

Figure 9:
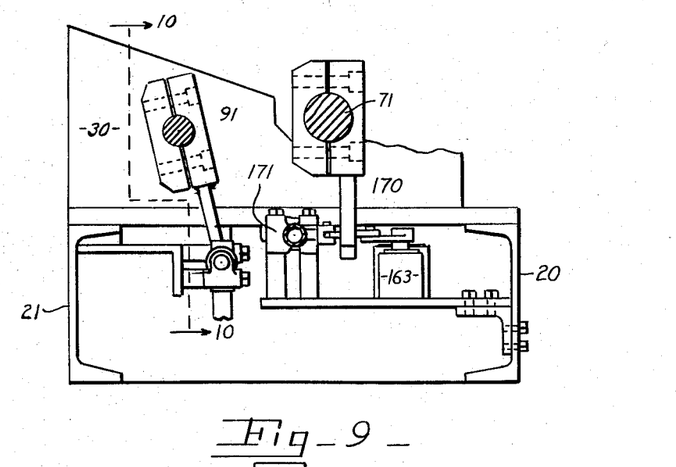
Figure 9 is a view taken on line 9—9, Figure 1.

It will be recalled that the angle lever 55, 58, for the lowermost tube is fixedly secured on shaft 71 running lengthwise of the machine, this shaft being oscillated by the cylinder 63. This shaft has a depending arm 170, see Figure 9, the lower end of which is positioned between the actuator of switch 163 and an air valve 171. When the tubes are closed, the arm 170 has engaged the actuator of switch 163 and closed the contacts thereof to provide the circuit for valve 161.

The feed motors thus maintain a forward pressure on the stock pushers 128, effecting advancement of the stock bars through the tubes each time the collet of the automatic bar working machine is opened. As each stock bar becomes exhausted, or used up, the blocks 122 fixed to the cables 123 engage the actuators 175 of switches 176. These switches are mounted on supporting plates 177 carried by vertically disposed arms 178 adjustably mounted on rods 180 extending forwardly from the plate 29 of the front head supporting section 25, see Figure 1. The switches 176 are connected in series. When all of the switches 176 have been closed by the actuators reaching the forward ends of the bar tubes, a circuit is completed from the side 180 of a power supply through switches 176, wire 182, to a movable contact 183. This contact is periodically moved into engagement with a contact 184 by a cam 185 rotated by a shaft 186 associated with the automatic bar working machine, the contacts 183, 184, being closed when the collets in the spindles of the bar machine are opened. Contact 184 is connected to a solenoid valve 189 through wire 187, and the return is provided by wire 188.

The valve 189 is connected to the exhaust end of the master valve 150 to permit its reversal and shift the air supply from line 160 to line 190. The line 190 is connected through branch conduits 191 to the motors 128, causing the motors to reverse and thus return all of the pushers in the bar tubes to the breech section of the machine.

When the pushers have been returned to the breech section, the blocks 122 engage the actuator members 192 of the valves 193. These valves are all connected in series to the line 190, and the outlet line 195 is connected by conduit 196, flow control valve 197, to cylinders 63 through line 198. The piston rods 62 of these cylinders are moved inwardly, or to the left, Figure 5, to open all of the bar tubes and to move the arm 170 into engagement with the actuator of valve 171. This valve is also connected to the line 195 and by line 200 supplies fluid pressure to the cylinders 104. The line 200 also includes an adjustable flow control valve 201.

The cylinders 104, Figure 6, actuate the bar loading devices 80, as previously explained, transferring the lowermost bar in each of the magazine slots 35 into the respective tubes.

Figure 10:
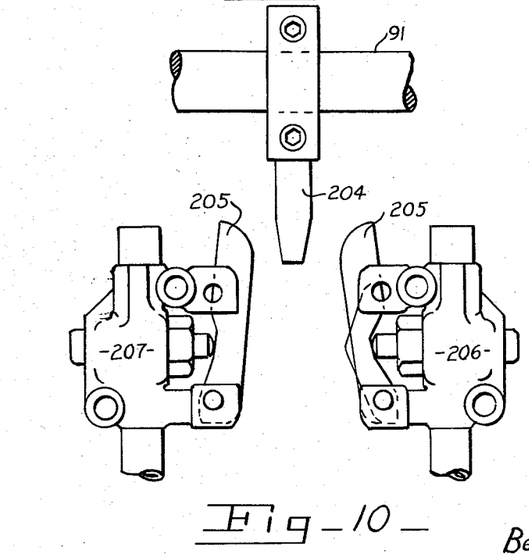
Figure 10 is a view taken on a line corresponding to line 10—10, Figure 9, to show the arrangement and actuator for the bar loading control valves.

The lowermost actuating shaft 91 for the bar loading mechanisms is also provided with a depending arm 204, see Figure 10, the lower end of this arm being positioned intermediate the actuators 205 of valves 206, 207.

With fluid pressure supplied to the cylinders 104 by line 200, the arm 204 actuates valve 207 to open position to exhaust pressure from the left hand end of the master valve 150 through conduit 208, permitting the valve to shift the supply from line 190 to line 160. This results in applying pressure through conduit 210 to the opposite ends of the cylinders 104 to return the pins 95, 97, to their normal position, as shown in Figure 7, this, of course, being accomplished by moving the shafts 91 in the reverse direction, whereby arm 204 opens valve 206, this valve being also supplied from the conduit 210 and when opened, supplying pressure through conduit 212 to the opposite ends of the cylinder 63 to effect closing of the now loaded bar tubes. As these tubes close, arm 170 actuates switch 163 to furnish power to the solenoid valve 161 to provide pressure on conduit 154 to effect forward operation of the motors 128, as previously explained.

It will be apparent that the bar feed mechanism functions to automatically feed stock bars to the vertically disposed series of spindles in a bar working machine.

What I claim is:

1. A stock bar feed mechanism for metal bar working machines having a plurality of work spindles arranged in a vertical series, said mechanism including a frame, a series of supporting structures mounted in spaced apart relation along the frame, a vertically disposed series of stock bar tubes mounted in said supporting structures, said tubes comprising a rear breech section and a loading section, the loading section of each tube including a tube portion movable to open and closed position, a stock bar magazine carried by said supporting structures and associated with each of said tubes for supporting a supply of stock bars, each of said magazines inclining downwardly toward its respective bar tube whereby to provide movement of the stock bars toward the tubes by gravity, a bar loading mechanism carried by each of said supporting structures and mounted intermediate each bar tube and the lower end of the associated magazine and operable when the movable portion of the tube is moved to open position to transfer the lowermost bar in the magazine to the open tube, motion transmitting means operable to simultaneously actuate all of said bar loading mechanisms and the movable portion of all of said tubes in timed relation, a stock bar pusher movable from the breech section of each of said tubes forwardly to feed the stock bars through said tubes to the spindles of the bar working machine, and power means operable to so advance each of said pushers and upon exhaustion of the bars in all of said tubes to return the pusher in each of said tubes to the breech section of the tubes, and power means connected to said motion transmitting means and operable when all of said pushers have returned to the breech sections of the tubes to actuate said mechanism.

2. A stock bar feed mechanism for metal bar working machines having a plurality of work spindles arranged in a vertical series, said mechanism including a frame, a series of supporting structures mounted in spaced apart relation along the frame, each of said supporting structures including a pair of vertically disposed plates fixedly mounted in spaced relation on said frame, a vertically disposed series of stock bar tubes mounted in said supporting structures and extending lengthwise of the frame, said tubes comprising a rear breech section and a loading section, the loading section of each tube including a tube portion movable to open and closed position, the vertically disposed plates of said supporting structures being formed with slots extending inwardly from one edge of said plates and inclining downwardly toward said tubes for supporting a supply of stock bars for each of said tubes, a bar loading mechanism carried by certain of said plates and being positioned at the inner ends of said notches and being operable when the movable portion of the bar tube is moved to open position to transfer the lowermost bar to the open tube, motion transmitting means common to all of said bar loading mechanisms to effect simultaneous operation thereof, a series of levers pivotally mounted between the plates of each of said supporting structures, each of said levers being connected at one end to said movable portions of said bar tubes, a second motion transmitting means common to all of said levers to effect simultaneous operation thereof to move the movable portions of said tubes to open and closed position, a stock bar pusher movable from the breech section of each of said tubes forwardly to feed the stock bars through the tubes to the spindles of the bar working machine, power means operable to so advance each of said pushers and upon the exhaustion of the bars in all of said tubes to return the pusher in each of said tubes to the breech section of the tubes and power means connected to said motion transmitting means and operable when all of said pushers have returned to the breech sections of the tubes to actuate said motion transmitting means in timed relation.

3. A stock bar feed mechanism for metal bar working machines having a plurality of work spindles arranged in a vertical series, said mechanism including a frame, a series of supporting structures mounted in spaced apart relation along the frame, a vertically disposed series of stock bar tubes mounted in said supporting structures and extending lengthwise of the frame, each of said tubes comprising a rear breech section and a loading section, the loading section of each tube including a tube portion movable to open and closed position, a stock bar magazine associated with each of said tubes, said magazines being carried by said supporting structures and adapted to support a supply of stock bars for each of said tubes, the stock bars in said magazines being movable by gravity toward said bar tubes, a bar loading mechanism mounted on each of said supporting structures and being operable when actuated, when the movable portion of the tube is moved to open position, to transfer the lowermost bar in the magazines to the open tubes, a vertically disposed series of shafts movably mounted in said supporting structures and extending parallel to said bar tubes for actuating said loading mechanisms, the movable portion of each bar tube being mounted on levers journalled in said supporting structures, a single shaft mounted on the frame and in said supporting structures and extending lengthwise of the frame, linkage connecting said single shaft with all of said levers for simultaneous movement thereof about their pivots, a stock bar pusher slidably mounted in each of said tubes, power means for advancing said pushers from the breech sections of said tubes forwardly for the advancement of stock bars through the tubes to the bar working machine and, upon exhaustion of the bars in all of said tubes to return the pusher in each of said tubes to the breech section of the tubes and a second power means for operating said series of shafts and said single shaft in timed relation.

References Cited in the file of this patent

UNITED STATES PATENTS

| | | |
|---|---|---|
| *300,084 | Jones | June 10, 1884 |
| 2,267,140 | Schottenberg | Dec. 23, 1941 |
| 2,345,207 | Mansfield | Mar. 28, 1944 |
| 2,548,786 | Harney | Apr. 10, 1951 |
| 2,577,203 | Mariotte | Dec. 4, 1951 |
| 2,595,522 | Harney | May 6, 1952 |